United States Patent [19]

Renholts

[11] 4,377,050

[45] Mar. 22, 1983

[54] LAMINATED TAPE FOR IMPRINTING

[76] Inventor: Roy J. Renholts, 984 Customs Rd., Pebble Beach, Calif. 93953

[21] Appl. No.: 269,519

[22] Filed: Jun. 1, 1981

[51] Int. Cl.³ .......................... G09F 19/00; B32B 7/12

[52] U.S. Cl. .......................................... 40/615; 40/616; 428/40; 428/156; 428/161; 428/202; 428/204; 428/207; 428/203; 428/346; 428/354; 428/913; 428/913.3; 346/135.1

[58] Field of Search ............... 428/207, 204, 202, 198, 428/195, 40, 354, 203, 156, 161, 346, 913, 913.3, 211; 156/220; 40/2 R, 615, 616; 346/135.1

[56] References Cited

U.S. PATENT DOCUMENTS

| | | | |
|---|---|---|---|
| 2,240,072 | 4/1941 | Hodgdon et al. | 428/203 X |
| 3,309,257 | 3/1967 | Borack | 428/913 X |
| 4,092,198 | 5/1978 | Scher et al. | 428/165 X |

*Primary Examiner*—Alexander S. Thomas
*Attorney, Agent, or Firm*—Robert Charles Hill

[57] ABSTRACT

The method and apparatus of the present invention are contemplated in combination with a laminated tape including a clear film and a suitable base, an extrudable adhesive being arranged between the clear film and the base along with a color agent adapted for transport with the adhesive during lateral extrusion. Substantial removal of the adhesive from a selected area of the laminated tape thus results in removal of the color agent and exposure of the base within the selected area. The method and apparatus contemplate means for applying heat and pressure to the selected area of the laminated tape within predetermined parameters for causing lateral extrusion of the adhesive layer and corresponding transport of the color agent to expose the base within the selected area. The method and apparatus of the invention preferably contemplate the laminated tape as being of an elongated configuration with a variety of indicia being available for sequentially imprinting different portions of the tape.

12 Claims, 9 Drawing Figures

LAMINATED TAPE FOR IMPRINTING

BACKGROUND OF THE INVENTION

The present invention relates to a laminated tape adapted for imprinting of selected indicia or patterns thereon and a method and apparatus for imprinting the laminated tape.

In the prior art, a number of different techniques have been described for imprinting or applying different indicia or designs upon a selected surface, commonly in the form of an elongated tape. Such techniques and devices are possibly best known at present under the DYMO trademark for imprinting letters, numbers and similar indicia upon elongated tape formed from a pigmented plastic. These techniques and devices have commonly been employed for producing labels upon selected lengths of tape, the tape having an adhesive backing for attachment to the surface to which the label is to be applied.

Within the specific prior art referred to above, the various indicia are applied to the tape by creasing or producing stress within the tape in a pattern of narrow linear elements. Stressing the tape in this manner causes the linear features of the pattern to assume a white or lightened color relative to the normal tape color. Thus, this technique and apparatus have commonly been employed for producing labels and the like by applying numbers, letters and the like in selected order to the tape.

This technique has gained wide popularity, particularly in the production of labels as described above. However, the prior art technique has certain limiting characteristics. Because of the need for applying substantial pressure in order to produce the stress which results in a color change of the tape, its use is generally limited to application of designs such as letters, numbers or the like which are entirely formed by generally thin linear elements. The need to produce substantial stress within the tape for producing the color change makes it difficult to produce designs having any portions of substantial width or dimension. At the same time, tape adapted for use with the technique described above is generally limited to a pigmented plastic which is lightened or changed to a white color by the application of stress. Thus, this technique is generally limited to production of a tape having a single background color with the imprinted designs in the forms of letters, numbers or the like being either white or a lighter variation of the same background color.

A number of other techniques have also been made available in the prior art for imprinting laminated tape or the like. For example, Cutler et al U.S. Pat. No. 3,575,755 issued Apr. 20, 1971 relates to a laminated tape which includes a layer of heat-shrinkable material, a selected design being applied to the tape by applying heat which causes the heat-shrinkable material to be pulled away from selected areas in order to expose a separate layer of an underlying material having a contrasting color or the like and thereby forming a selected design or indicia. However, within this technique, its laminated tape is relatively complex at least in part because of the characteristics of the heat shrinkable material. In addition, the final design depends upon the amount of shrinkage for different parts of the design so that resolution of the finished design may tend to vary depending upon the tape and application of the selected design.

Kanzelberger U.S. Pat. No. 4,047,996 issued Sept. 13, 1977 relates to yet another method and apparatus for imprinting plastic plates wherein pigment is transferred from a carrying film in a technique commonly referred to as a hot stamp process. Thus, the method and apparatus of this reference is more commonly classified as an applique technique which differs substantially from the present invention in a manner to be described in greater detail below.

Perrington et al U.S. Pat. No. 4,123,309 issued Oct. 31, 1978 relates to a transfer letter system wherein pigment is transferred from a carrier film by selectively softening portions of a design with radiation and allowing those portions to adhere to another strip or tape of contrasting color. Here again, it may be seen that the technique of this reference also falls within the classification of an applique.

Finally, Scher et al U.S. Pat. No. 4,092,198 issued May 30, 1978 relates to a process for embossing and laminating wherein substantial pressures and temperatures are applied over long periods of time to a thermosetting plastic in order to produce a contrasting pattern having gradual color transitions. The process is relatively complex involving application of excessive pressures in the range of 800–1200 psi, for example, and excessive temperatures in the range of 260°–310° F. These conditions are necessary since the invention further contemplates formation of the design in a coating formed from a thermosetting plastic such as a melamine resin, the excessive pressures and temperatures being necessary to produce limited lateral movement resulting in a pattern formed by generally gradual color transitions.

Other techniques have also been available in the prior art. However, it is believed that those described above are generally representative of the prior art while indicating the need for a laminated tape and a method and apparatus of applying indicia thereto by simplified techniques permitting greater versatility in both the design applied to the tape and color combinations possible in the finished tape as well as simplicity of the tape and the method and apparatus for imprinting the tape.

SUMMARY OF THE INVENTION

It is therefore an object of the invention to provide a laminated tape or the like including an adhesive vehicle layer arranged between a clear film and a suitable base, the adhesive vehicle layer being extrudable under combined effects of heat and pressure with a color agent arranged in contact with the adhesive vehicle layer and adapted for transport by the adhesive layer during extrusion so that the base is exposed through a selected area to which heat and pressure are applied, the adhesive layer and color agent being generally viscous under normal conditions in order to assure adhesion within the laminated tape.

It is an associated object of the invention to provide a method and apparatus for imprinting laminated tape of the type described above with selected indicia or design features. The method and apparatus include arrangement of a selected portion of the laminated tape between a heated indicia platen arranged generally adjacent the adhesive layer and a supporting platen on the opposite side of the tape, the heated indicia platen being urged against the tape and toward the supporting platen for extruding the adhesive layer and accordingly transporting the color agent from a selected area defined by the indicia platen.

A laminated tape of the type referred to above provides a number of advantages in accordance with the pesent invention. Initially, the adhesive layer is selected to have a viscous consistency under normal conditions so that it serves to secure the clear film on one side of the laminated tape to the base on the other side of the adhesive layer. Within such a combination, the color agent may be either a layer arranged on either side of or within an intermediate portion of the adhesive layer or dispersed within the adhesive layer itself. It will be immediately apparent that if the color agent is to be formed as a layer, the color agent must also provide suitable adhesive characteristics under normal conditions for maintaining the laminated construction between the clear film, the adhesive layer with the color agent and the base.

Particular advantages provided by the present invention reside in the freedom of design for the indicia platen or platens defining the selected area from which the adhesive layer is to be extruded with corresponding removal of the color agent. Because of the ability of the adhesive to be substantially liquefied by application of heat and pressure for a short period of time, the adhesive layer and color agent may be extruded from relatively broad surface portions of the tape. Thus, the particular laminated tape as well as the method and apparatus of the present invention may be employed for applying a greater variety of designs to a laminated tape. The laminated tape preferably has an elongated configuration of a type commonly employed for forming labels or the like. However, within the scope of the present invention, other configurations for the tape are also possible.

An additional factor of design freedom is provided whereby a wide variety of contrasting colors may be formed from the tape and within the selected areas where the adhesive layer is extruded along with the color agent. For example, the laminated tape may include any color in combination with the extrudable adhesive layer, the base including an opaque layer of a color which contrasts, harmonizes or otherwise varies from the color agent associated with the adhesive layer. Furthermore, the base may even be in the form of a second clear film adapted for attachment to another surface, the other surface thereby forming the contrasting color which may be viewed through the selected areas formed by the extrusion of the adhesive layer within the laminated tape. The invention also permits the color agent to be translucent or transparent, the tape then originally having a color resulting from combination of the color agent and underlying color, imprinted portions of the tape corresponding with the underlying color alone.

From the preceding summary of objects and advantages of the invention, it will be apparent that the laminated tape may embody a number of different configurations within the scope of the present invention. A number of exemplary tape configurations are described hereinbelow. However, it will further be apparent that even these exemplary tapes are not exhaustive as to the possibilities for the laminated tape according to the invention.

Yet another important feature of the invention results from the lateral extrusion of the adhesive which transports or carries the color agent away from selected surface portions. As the adhesive layer and color agent are laterally transported due to application of pressure by the heated indicia platen, the color agent tends to be generally intermixed with the extruding adhesive layer, lateral extrusion of the adhesive and color tending to cease as the materials pass beyond the perimeter of the heated indicia platen. At that point, just beyond the perimeter of the heated indicia platen, a substantial buildup of adhesive and color agent results, tending to create an even greater contrast between the color of the color agent and the exposed area of the base. Accordingly, the present invention is particularly effective in providing a highlighted region surrounding the periphery of an imprinted design in order to provide an even more visible and pleasing effect.

Additional objects and advantages of the invention are made apparent in the following description having reference to the accompanying drawings.

DESCRIPTION OF THE PREFERRED EMBODIMENT

Figure 1:
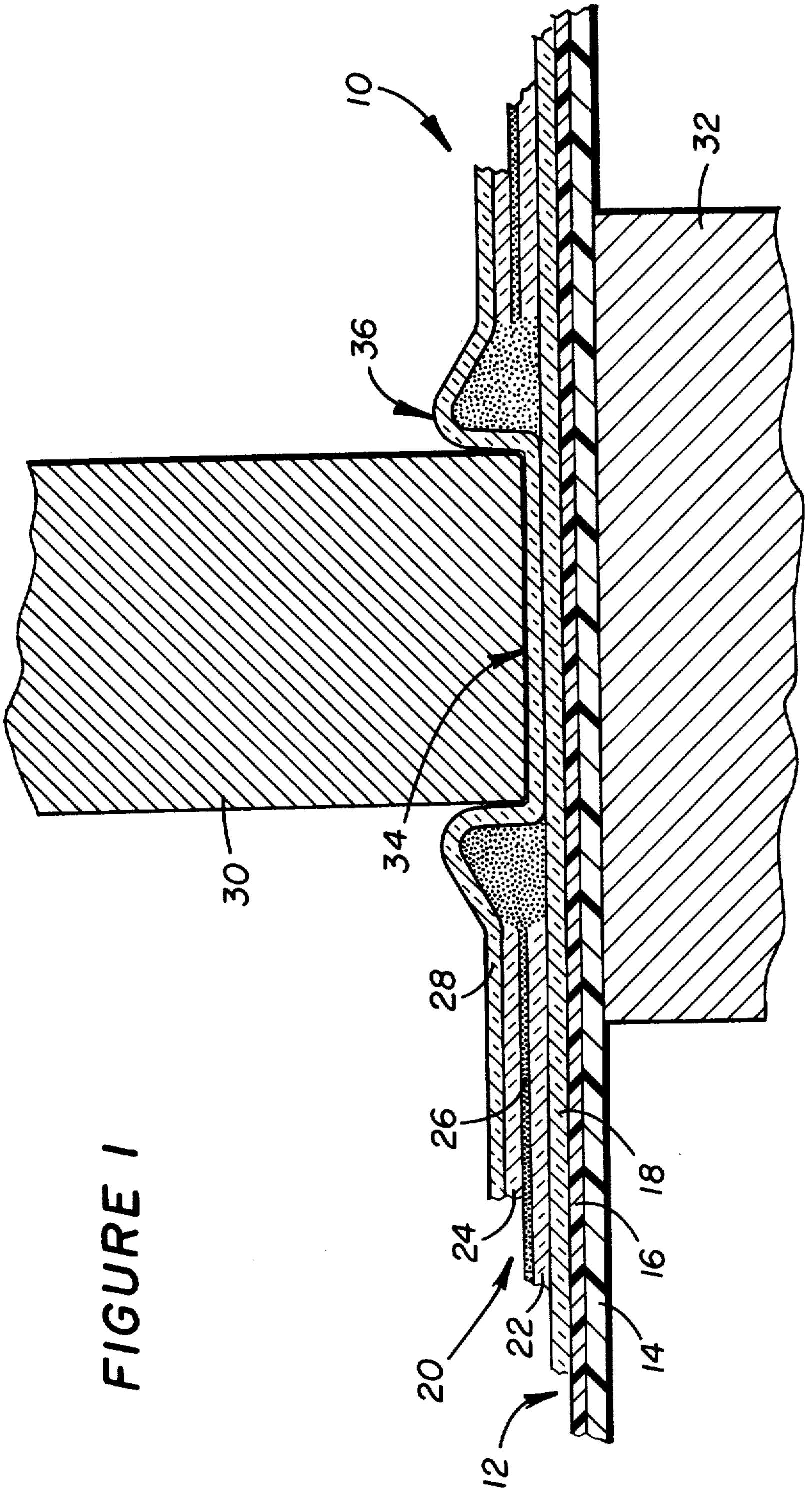
FIG. 1 is a view in cross section of one embodiment of a laminated tape in accordance with the present invention, the laminated tape being illustrated in conjunction with a heated indicia platen and a supporting platen for imprinting the tape in accordance with the invention.

Referring now to the drawings and particularly to FIG. 1, the present invention relates to a laminated tape 10 which is adapted for application of heat and pressure to selected areas for causing interruption of a layer of color associated with an extrudable adhesive in order to expose an underlying surface. Within FIG. 1, the laminated tape 10 is formed with a base 12 including a peelable backing 14, a colored adhesive layer 16 and a clear film 18. An adhesive layer 20 is formed by two portions 22 and 24 with an intermediate color agent layer 26. A clear film 28 forms the upper surface of the laminated tape above the combined adhesive and color agent layer. The particular materials of construction and manner of fabrication for the laminated tape 10 are described in greater detail below in connection with FIG. 4.

However, before proceeding with a detailed description of the various laminated tape embodiments of the invention, the method and apparatus contemplated by the present invention for use in combination with laminated tape of the type indicated at 10 in FIG. 1 are considered with reference to a heated indicia platen 30 arranged opposite a supporting platen 32. The laminated tape 10 is arranged between the heated indicia platen 30 and the supporting platen 32 with the adhesive layer 16 generally adjacent the heated indicia platen 30. With the laminated tape so arranged, the heated indicia platen and supporting platen are then urged toward each other in order to simultaneously apply heat and pressure to a selected area of the laminated tape formed by the configuration of the heated indicia platen 30.

The heat from the indicia platen 30 causes the adhesive layer immediately therebeneath to be liquefied. As the adhesive layer is liquefied, it is laterally extruded outwardly from the area of the indicia platen due to pressure applied between the indicia platen 30 and the supporting platen 32. At the same time, the color agent within the layer 26 is selected so that it is dissolved or otherwise transported by the liquefied adhesive for removal from the area underlying the heated indicia platen. In this manner, a selected area 34 defined within the outline of the heated indicia platen is formed with the adhesive layer and associated color agent being removed in order to expose the base of the laminated tape and within the embodiment 10, the color of the colored adhesive layer 16.

In the method of the present invention, a pressure in the range of about 300 psi is applied to the tape by the platens 30 and 32 while the adhesive layer is heated to a range of 165°-180° F. by the heated platen 30. This requires urging of the platens against the tape for a period of less than one second. The parameters of pressure temperature and time may vary substantially depending, for example, on the composition of the adhesive layer, its thickness and the size and design of the indicia platen. Such changes will, of course, be obvious to one skilled in the art of such adhesives.

In addition, it may be seen from FIG. 1 that as the liquefied adhesive is laterally extruded from beneath the heated indicia platen, it tends to mix with the color agent, lateral movement of the adhesive and color agent tending to cease immediately as it passes outside the perimeter of the heated indicia platen and commences cooling. Thus, the combination of the liquefied adhesive and color agent tends to provide a highlighted region 36 of substantial thickness immediately about the periphery of the heated indicia platen. This concentration of color agent thus serves to provide better definition at the juncture between the remaining color agent and the exposed surface portion 34 of the underlying colored adhesive layer 16.

Within the surface area 34 formed by extrusion of the adhesive layer, the upper film of the tape is adjacent to the base and may be adhered thereto either by the application of heat and pressure or by a very thin layer of transparent adhesive remaining from the adhesive layer.

Figure 2:
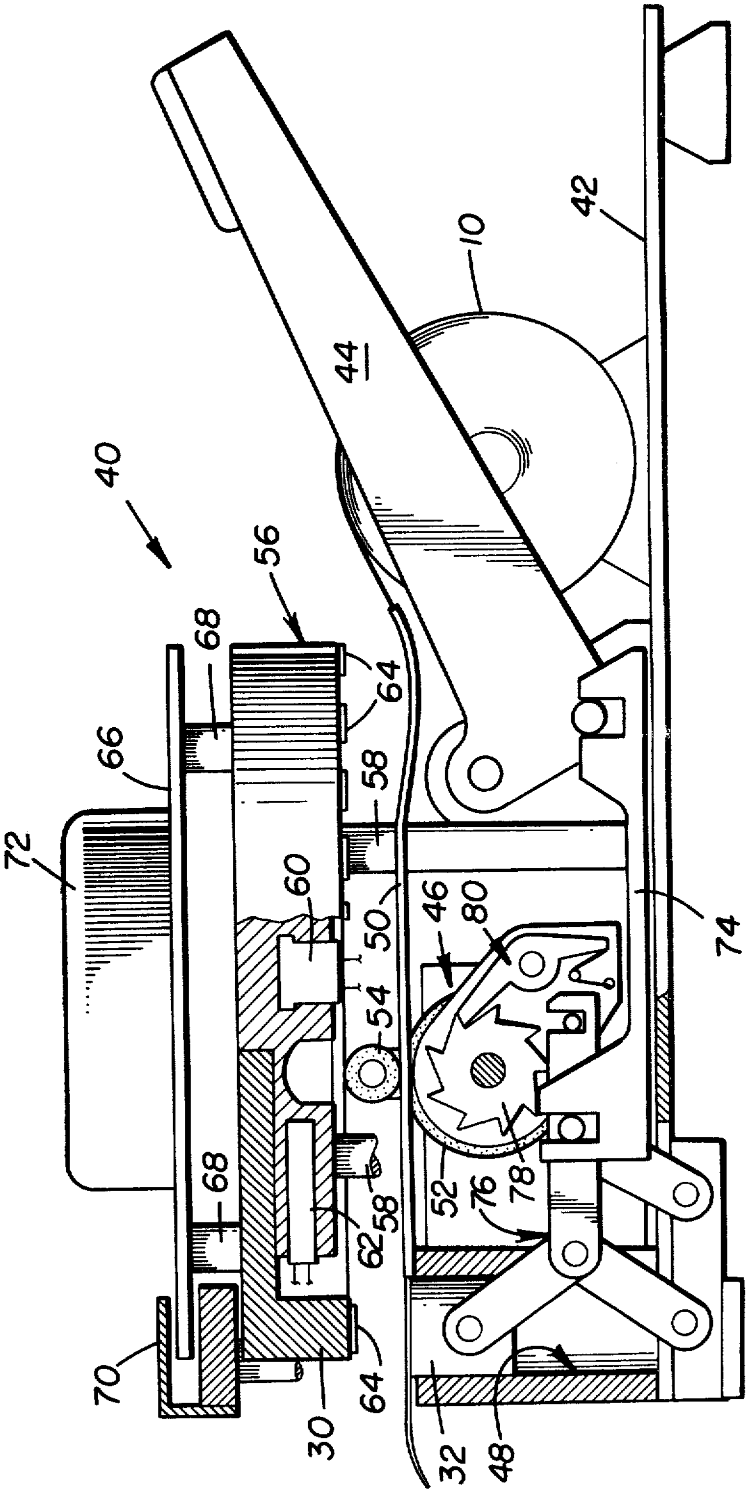
FIG. 2 is a side view, with parts in section, of printer apparatus suitable for imprinting the laminated tape of the present invention.
Figure 3:
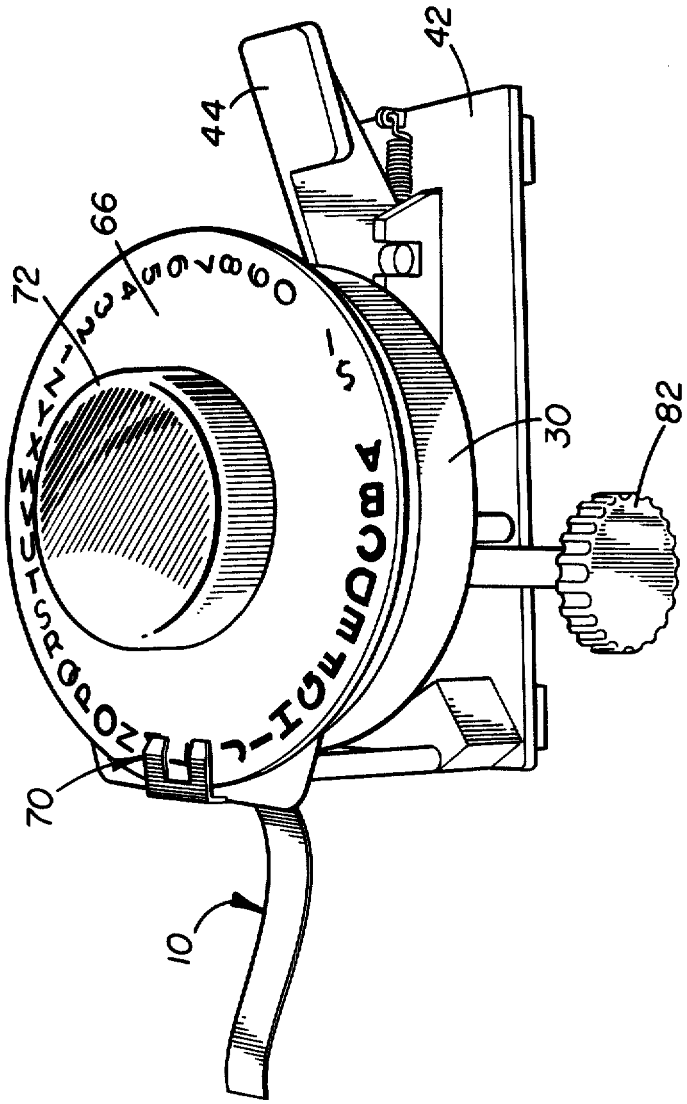
FIG. 3 is a perspective view of the printer apparatus of FIG. 2.

Although the method of imprinting a design upon the laminated tape is believed to be clearly apparent from the preceding description, it will be even more clearly demonstrated by consideration of the apparatus illustrated in FIGS. 2 and 3. However, before referring to those figures, it is noted in connection with FIG. 1 that the configuration of the laminated tape as embodied, for example, in the tape 10 of FIG. 1 and the method of the invention permits substantial freedom of design for the heated indicia platen 30. For example, because of the adhesive layer being liquefied, it can be extruded across a relatively substantial lateral dimension. Thus, the heated indicia platen or a series of similar platens may be designed with greater variety and may include substantial dimensions in their various portions.

Referring now to FIGS. 2 and 3, the printer apparatus 40 of the present invention includes an elongated base 42 supporting an operating handle 44, a ratchet assembly 46 and a vertically aligned cylinder or guide

48 containing the supporting platen 32 referred to above in connection with FIG. 1.

The printer apparatus 40 also includes a guide 50 for introducing a supply of tape 10 into alignment above the support platen 32. As the tape 10 approaches the support platen, it passes between a rubber feed roll 52 driven by the ratchet assembly 46 and a rubber idler roll 54 mounted in opposition to the feed roll 52 for urging the tape 10 into drive engagement with the roll 52.

An upper platen 56 is arranged in spaced-apart relation generally above the support platen 32 by a plurality of pins 58 extending upwardly from the base 42. The platen 56 includes a plurality of electrically operated cartridge heaters such as that indicated at 60 and a thermostat 62 which are interconnected by suitable circuitry and a source of energy (not otherwise shown). For example, the cartridge heater 60 and thermostat 62 may be interconnected with a power source of any type for producing heat within the platen 56.

The heated indicia platen 30 described above in connection with FIG. 1 is preferably formed as a rotatable unit mounted in thermally conductive relation with the upper platen 56. For example, both the upper platen 56 and the indicia platen 30 may be formed from a suitably conductive metal such as copper or aluminum. Even more preferably, the heated indicia platen 30 is formed with a plurality of indicia or different selected designs about its periphery as indicated at 64. The heated indicia platen 30 may thus be rotated upon the upper platen 56 in order to align one of its various indicia 64 with the supporting platen 32. For this purpose, an indicator plate 66 is attached to the heated indicia plate 30 by heat insulating spacers 68 and lies in a plane under an indicator assembly 70. As may be better seen in FIG. 3, the upper surface of the indicator plate 66 includes a representation of indicia in corresponding locations to those indicated at 64. As the heated indicia platen 30 is rotated, the various indicia formed upon the indicator plate 66 are centered upon the indicator assembly 70 when the corresponding indicia 64 is in alignment with the supporting platen 32. The heated indicia platen 30 may be rotated along with the indicator plate 66 by the upper knob 72.

Referring again to the components mounted upon the base 42, the pivoted handle 44 is interconnected with both the ratchet assembly 46 and the support platen 32 by means of an elongated link 74 and a toggle assembly 76. The toggle assembly 76 is also interconnected with the base 42 and the support platen 32 so that as the handle 44 is depressed, the support platen 32 is urged upwardly against the heated indicia platen 30. The handle 44 is then maintained in its depressed condition for a suitable period of time required for liquefication of the adhesive layer and its extrusion in the manner described above in connection with FIG. 1. Thereafter, the handle 44 is raised or retracted and, during retraction, causes the toggle assembly 76 to interact with a ratchet wheel coupled with the drive or feed roll 52 so that the drive or feed roll 52 rotates and advances the position of the tape 10. In this manner, a portion of the tape imprinted by the prior interaction of the heated indicia platen 30 with the support platen 32 passes out of register with a fresh portion of the tape being placed in register therebetween. A spring-loaded pawl 80 interacts with the ratchet wheel 78 to rotate feed roll 52.

In operation, any of the various indicia 64 may be arranged in register with the support platen 32 by rotation of the knob 72. With a selected indicia 64 in alignment with the support platen 32 and a generally continuous portion of the tape 10 being arranged in register between the platens, the handle 44 is depressed causing the support platen 32 to press the tape upwardly against the heated indicia platen 30 in order to imprint the tape in the manner described above in connection with FIG. 1. Note that the ratchet wheel 78 and feed roll 52 may be rotated by an external knob 82 in order to advance or retract the tape as desired. When it is desired to retract the tape, the pawl 80 is disengaged from ratchet wheel 78 by means of a lever (not shown). A fixed delay could also be incorporated into the toggle assembly by conventional means (not shown) in order to assure that the tape is impressed between the two platens for a particular time period as described above.

Figure 4:
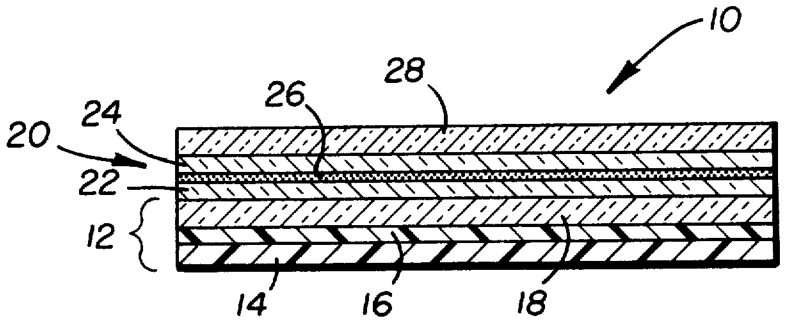
FIGS. 4–9 are different embodiments of a laminated tape each including features in accordance with the present invention and suitable for use with the method and apparatus of the invention as embodied, for example, within the printer apparatus of FIGS. 2 and 3 to result in an imprinted tape of the type generally represented in FIG. 1.

As was noted above, the present invention contemplates a wide variety of configurations for the laminated tape in addition to the specific configuration described above and indicated at 10 in FIG. 1. The tape configuration of FIG. 1 is also illustrated in FIG. 4 prior to imprinting of any design thereupon. Accordingly, the various components for the tape as illustrated in FIG. 4 are numbered in accordance with the preceding description.

As illustrated in FIG. 4, the tape configuration 10 is formed with the clear film 18 being cellulose acetate, for example, and having a conventional pressure-sensitive adhesive forming the colored adhesive layer 16. Such a tape is available, for example, from 3M Company under the trade designation Decorator Tape Catalog No. 150. A removable backing formed, for example, from polyethylene film or the like is applied to the colored adhesive surface to permit exposure of the colored adhesive surface 16 when desired. The polyethylene film is suitable for this purpose because of its generally waxy surface which tends to permit its removal from the colored adhesive layer 16.

The adhesive layer portion 22 is then applied to the clear film 18. For example, the adhesive layer portion 22 may be applied thereto as a liquid and allowed to become viscous. The adhesive layer portion 22 may, for example, have a composition of natural rubber, resin and an anti-oxident which are commonly employed in adhesive clear tapes as presently sold.

The color agent layer 20 is then applied to the adhesive layer portion 22, for example, by spraying or otherwise applying a fast-drying lacquer or other coloring material and allowing it to dry. Finally, a clear pressure-sensitive tape may then be applied over the color agent or lacquer coating 20 to include both the upper adhesive layer portion 24 and the clear tape 28. Here again, this combination of the upper adhesive layer portion 24 and clear tape 28 may be one of the common clear tapes sold, for example, under the SCOTCH TAPE trademark. Returning again to the color agent 20, it is noted that it provides a layer between the two adhesive layer portions 22 and 24. Accordingly, it is necessary to select the color agent to provide a number of capabilities. Initially, the color agent must be carried away during extrusion of the adhesive layers. However, in addition, the color agent must also serve to provide adhesion between the two adhesive layer portions 22 and 24 under normal conditions in order to prevent separation within the tape.

Within the embodiment 10 of FIG. 4, the combined thickness of the two adhesive layer portions 22 and 24 may have a thickness of, for example, approximately one to two mils. With a typical combined thickness of about 1.5 mils, extrusion of the combined adhesive layer in the manner described above will result in a typical highlighted region (see 36 in FIG. 1) having a thickness, for example, of about 5 mils. Such a proportion has been found to provide excellent highlighting about the periphery of the selected area 34 formed by the indicia 64. The amount of color agent will be less than the adhesive layer, being sufficient to provide desired color depth while still permitting removal of substantially all of the color agent from selected areas by extrusion of the adhesive layer. The dimensions of the other components within the film are not particularly critical and will be obvious to one skilled in the art.

Figure 5:
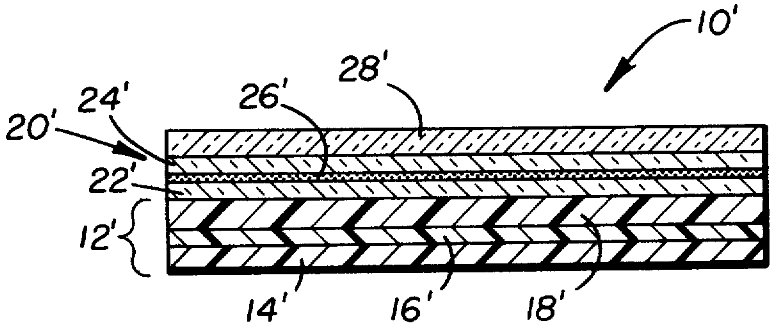

Referring now to FIG. 5, yet another embodiment of a laminated tape is indicated at 10' and includes components generally similar to those described above in connection with the laminated tape embodiment 10 of FIG. 4. Accordingly, similar primed numerals are employed to indicate the various components of the tape 10' of FIG. 5. The tape of FIG. 5 varies from that of FIG. 4 primarily in that the film layer 18' rather than the adhesive layer 16' includes a generally opaque color. Thus, the embodiment of FIG. 5 is generally similar to that of FIG. 4 in that upon extrusion of the combined adhesive layer from a selected surface area, the opaque color of the film 18 would be exposed through the upper clear film 28'. However, the film embodiment 10' of FIG. 5 is generally less preferable than that of FIG. 4 since it is relatively more expensive to provide coloring within a plastic film as compared to the adhesive layer.

Figure 6:
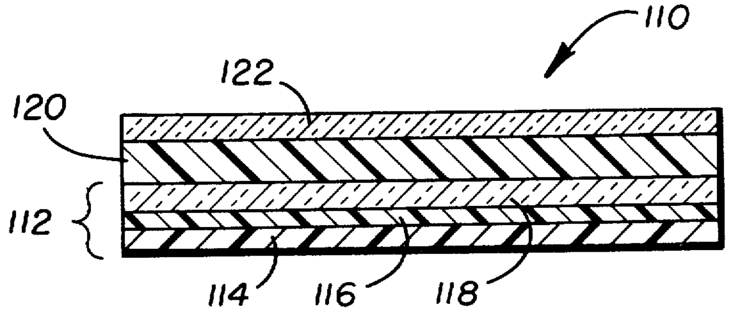

Another tape embodiment is indicated at 110 in FIG. 6. The tape 110 includes a base 112 similar to that of FIG. 4 in that it includes a peelable backing 114, a colored adhesive layer 116 and a clear film layer 118 corresponding respectively to the components 14, 16 and 18 of FIG. 4. However, the adhesive layer 20 of FIG. 1 is replaced by a single layer of adhesive as indicated at 120. Furthermore, the color agent is a conventional pigment dispersed within the adhesive 120. Finally, a clear film 122 is arranged above the colored adhesive. Here again, the colored adhesive layer 120 has a similar consistency and overall thickness as the combined adhesive layer 20 of FIG. 4. For example, the color agent may be a conventional colorant such as iron oxide when red is desired.

Figure 7:
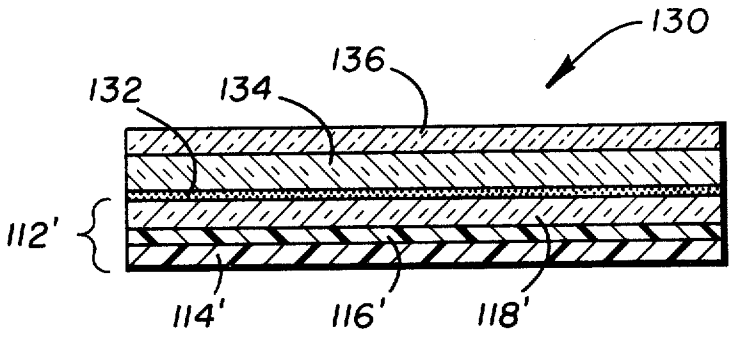

Yet another tape embodiment is indicated at 130 in FIG. 7 and includes a base 112' comprising components 114', 116' and 118' generally similar to the components for the base 112 of FIG. 6. However, within the embodiment 130 of FIG. 7, a color agent or layer in the form of a conventional ink coating 132 is then applied directly upon the clear film 118'. An adhesive layer 134 and clear film 136 are then applied above the ink coating 132 after it is dry. Here again, the adhesive layer 134 and clear film 136 may be similar to those described above in connection with FIG. 6 except that the adhesive layer 134 of FIG. 7 is clear.

Figure 8:
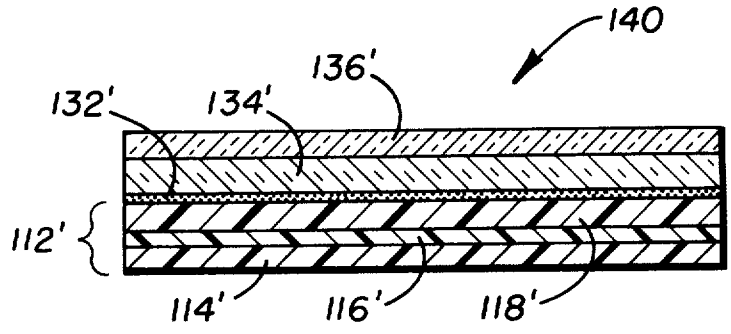

Still another tape embodiment 140 is illustrated in FIG. 8. The tape 140 of FIG. 8 is generally similar to that of FIG. 7 except that the adhesive layer 116' is clear while the film layer 118' is colored. Here again, the embodiment of FIG. 7 is generally preferable to that of FIG. 8 since it is easier to apply coloring to the adhesive than to the film layer.

Figure 9:
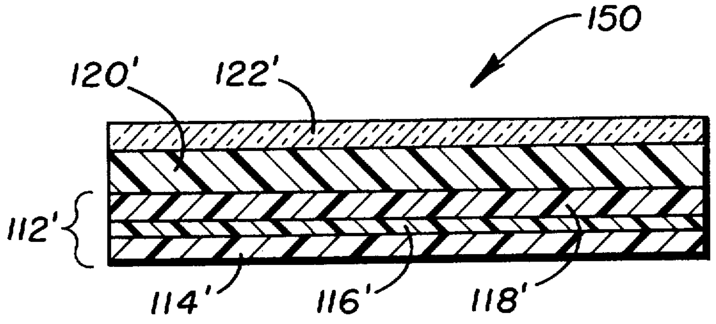

Yet another laminated film embodiment 150 is provided as a variation of the embodiment 110 of FIG. 6. However, within the embodiment 150, the clear film 118 and colored adhesive layer 116 are replaced by a colored film 118' and a clear adhesive layer 116'. Accordingly, the embodiment of FIG. 9 may be less preferable than that of FIG. 6 at least from a cost standpoint.

In any event, the various embodiments of FIGS. 1 and 4–9 clearly indicate that a substantial variety of different combinations are possible within the laminated tape of the present invention. At the same time, it is apparent that various modifications are also possible within the method and apparatus of the invention. For example, it will be apparent that a wide variety of materials could be used for the various films described within the various laminated tape embodiments along with he various adhesives and color agents as described above. Similarly, dimensions, thicknesses and other characteristics of the tape could readily be employed within the invention. Accordingly, the scope of the invention is defined only by the following appended claims.

What is claimed is:

1. A laminated tape adapted for imprinting of indicia upon selected surface portions thereof, comprising a suitable base layer, a clear film forming an upper layer of the laminated tape, an adhesive vehicle layer comprising two layer portions being arranged intermediate the base layer and the clear film, and a color agent forming a layer intermediate the two adhesive layer portions to provide a selected color across the area of the tape as viewed through the clear film, the adhesive layer and color agent being generally viscous under normal conditions in order to assure adhesion within the laminated tape, the adhesive vehicle layer being extrudable under combined effects of heat and pressure applied to a selected surface portion of the tape to result in lateral extrusion of the adhesive vehicle layer and the color agent away from the selected surface area.

2. The laminated tape of claim 1 wherein the base layer is transparent, permitting the color of a surface to which a tape is applied to be visible through the selected surface area of the tape.

3. The laminated tape of claim 2 wherein the base layer comprises an adhesive surface and a removable backing over the adhesive surface to facilitate application of the laminated tape to a selected surface.

4. The laminated tape of claim 1 wherein the base layer comprises adhesive means for facilitating application of the laminated tape to a selected surface.

5. The laminated tape of claim 1 wherein the color agent forms an opaque color in the tape beneath the clear film.

6. The laminated tape of claim 5 wherein the base layer forms another color which is visible through the selected surface area upon imprintation of the tape.

7. The laminated tape of claim 1 wherein the base layer forms another color which is visible through the selected surface area upon imprintation of the tape.

8. The laminated tape of claim 1 wherein a selected indicia is applied to the selected surface area of the tape by heating and pressurizing the tape to extrude the adhesive layer and corresponding color agent from the selected surface area, and extruded combination of adhesive and color agent tending to concentrate about the periphery of the selected surface area to provide a highlight effect between the selected surface area and the surrounding portions of the tape.

9. The laminated tape of claim 1 wherein the base layer comprises a clear base film adjacent to the adhesive layer and colored adhesive means adjacent to the clear base film for facilitating application of the tape to a selected surface.

10. The laminated tape of claim 9 wherein the colored adhesive means comprises a colored adhesive base layer and a peelable backing for selectively exposing the colored adhesive base layer.

11. The laminated tape of claim 1 wherein the adhesive layer comprises two clear adhesive layer components, the color agent comprising a layer of pigment intermediate the two clear adhesive layer components, the base layer comprising a colored base film adjacent the adhesive layer and adhesive means for facilitating mounting of the tape to a selected surface.

12. The laminated tape of claim 11 wherein the adhesive means comprises an adhesive base layer secured to the colored film and a peelable backing for selectively exposing the adhesive base layer for application to the selected surface.

* * * * *